United States Patent [19]

Okudaira et al.

[11] 4,055,621

[45] Oct. 25, 1977

[54] PROCESS FOR OBTAINING TITANIUM TETRACHLORIDE, CHLORINE AND IRON OXIDE FROM ILMENITE

[75] Inventors: Shigenori Okudaira, Chigasaki; Mitsuo Takahashi, Tokyo; Takefumi Irie, Chigasaki; Eiji Itoh, Urawa; Koh Kashiwagi, Hiratsuka, all of Japan

[73] Assignee: Nihon Kogyo Kabushiki Kaisha, Tokyo, Japan

[21] Appl. No.: 583,382

[22] Filed: June 3, 1975

[30] Foreign Application Priority Data

June 7, 1974 Japan .................. 46-64133

[51] Int. Cl.$^2$ .................. C01B 7/00; C01G 23/02; C01G 49/06; C01G 49/08
[52] U.S. Cl. .................. 423/79; 423/148; 423/500
[58] Field of Search .................. 423/148, 632, 633, 69, 423/500, 76, 149, 493, 267, 79, 492

[56] References Cited

U.S. PATENT DOCUMENTS

| 275,498 | 4/1883 | Kirk | 423/641 |
|---|---|---|---|
| 1,601,898 | 10/1926 | Wiley et al. | 423/267 |
| 2,307,253 | 4/1928 | Yee et al. | 423/267 |
| 2,642,339 | 6/1953 | Sawyer | 423/633 |
| 2,657,976 | 11/1953 | Rowe et al. | 423/633 |
| 3,325,252 | 6/1967 | Wikswo et al. | 423/500 |
| 3,793,444 | 2/1974 | Reeves et al. | 423/633 |
| 3,865,920 | 2/1975 | Dunn, Jr. | 423/148 |

FOREIGN PATENT DOCUMENTS

| 576,898 | 6/1959 | Canada | 423/267 |
|---|---|---|---|

*Primary Examiner*—O. R. Vertiz
*Assistant Examiner*—Wayne A. Langel
*Attorney, Agent, or Firm*—Seidel, Gonda & Goldhammer

[57] ABSTRACT

A process for obtaining chlorine and iron oxide from iron chloride by adding iron oxide to iron chloride prepared by chlorinating iron-containing titanium ore, in an amount of above 10 percent by weight of the resulting mixture, charging the mixture in solid phase into a fluidizing roasting furnace for oxidizing roasting, extracting the overflow from the fluidized bed in the furnace, and charging the extract into another secondary furnace for additional oxidizing roasting. The iron oxide thus obtained is cooled and recycled to the fluidized bed in the primary fluidizing roasting furnace for the purpose of controlling the reaction temperature in the furnace.

29 Claims, No Drawings

4,055,621

PROCESS FOR OBTAINING TITANIUM TETRACHLORIDE, CHLORINE AND IRON OXIDE FROM ILMENITE

BACKGROUND OF THE INVENTION

1. Field of the Invention

This invention relates to a process for recovering chlorine and obtaining iron oxide, through oxidizing roasting, from the iron chloride that is secondarily produced in the manufacture of titanium tetrachloride by chlorination of iron-containing titanium ore, e.g., ilmenite or such like titanium minerals.

2. Description of the Prior Art

Titanium tetrachloride, the starting material for producing titanium metal, chlorine-process titanium oxide, and the like, is commonly prepared in either of two ways. In one method iron and other ingredients than titanium in the ore are selectively chlorinated and evaporated by use of chlorine or other chlorinating agent to separate iron chloride and the like and obtain a high grade intermediate product rich in titanium, and then the intermediate product is further chlorinated for producing titanium tetrachloride. The other method directly chlorinates the ore to form titanium tetrachloride and iron chloride vapours together followed by separating them.

In these processes, both of which depend on chlorinating volatilization or evaporation with chlorine for the separation and recovery of titanium tetrachloride, iron chloride is inevitably produced because by nature the iron content of the titanium ore is chlorinated in preference to the titanium content.

The resulting iron chloride composition consists principally of a mixture of ferrous and ferric chlorides and the balance other chlorides originating from the ingredients included in the titanium ore, and also includes a minor proportion of coke used as the reducing agent for chlorination and carryover materials. The iron chloride has only quite limited application owing to its poor purity, and it is advantageous to oxidize it to recover chlorine gas and obtain iron oxide which may subsequently be used as a raw material for iron manufacture.

A process previously proposed for the treatment of such an iron chloride composition consists of transferring iron chloride in gaseous phase directly from the furnace for chlorinating the titanium ore into an oxidizing furnace immediately connected to the chlorinating furnace and carrying out an oxidizing treatment in the presence of oxygen in the oxidizing furnace to recover chlorine and obtain iron oxide.

The aforementioned process however has a number of shortcomings. Since the chlorinating furnace is directly connected to the oxidizing one, the other gases e.g., carbon monoxide, carbon dioxide and nitrogen are entrained in the gaseous iron chloride flow from the former furnace, and reduce the iron chloride concentration. Accordingly the concentration of the chlorine gas resulting from the oxidizing reaction of the gaseous iron chloride is also diluted. Also, because changes and shifts in the operational condition or circumstance of the chlorinating furnace usually are accompanied by fluctuations in the rate of gas production, temperature, pressure, and other working factors, it is very difficult to chose the optimum conditions under which the oxidizing reaction of iron chloride is satisfactorily effected in the oxidizing furnace; if not properly handled the iron chloride may unintendedly be discharged unreacted from the furnace. In other respects, too, the oxidizing furnace is difficult to operate as it is directly influenced by variations in the operating conditions of the chlorinating furnace.

As already noted, iron chloride is limited in its application and involves difficulties in oxidation treatment thereof. In the absence of any simple and effective technique to be employed instead, the preparation of high-grade titanium minerals or titanium tetrachloride from iron-containing titanium ores such as ilmenite by chlorination has been hampered by the secondary production of iron chloride and this has so far been a problem in the art.

BRIEF SUMMARY OF THE INVENTION

The present invention resides, in one aspect, in a process for obtaining chlorine and iron oxide from iron chloride by adding iron oxide to iron chloride preliminarily prepared by chlorinating iron-containing titanium ore in an amount above 10 percent, preferably 10 to 50 percent by weight based on the resulting mixture, charging the mixture in solid phase into a fluidizing roasting furnace for effecting the oxidizing roasting therein, extracting the overflow from the fluidized bed in the furnace, and charging the extracted overflow into another roasting furnace for oxidizing roasting in the presence of oxygen.

It should be noted that the term "iron chloride" is defined herein as a composition which is composed of ferrous and ferric chlorides as a major part and other chlorides originating from the ingredients included in titanium ore, and which also includes a minor proportion of coke and carryover material inevitably mingled thereto.

In another aspect, the invention resides in the aforedescribed process wherein the iron oxide finally obtained is cooled and recycled into the fluidized bed in the fluidizing roasting furnace so as to control the reaction temperature in the furnace.

In still another aspect, this invention provides a process for producing titanium tetrachloride as well as iron oxide from iron-containing titanium ore.

DETAILED DESCRIPTION OF THE INVENTION

For the purpose of the invention, the iron chloride to be treated is separated and recovered from iron-containing titanium ores, such as ilmenite, through chlorination and selective volatilization by use of chlorine in the manner already described. The iron chloride in solid phase is premixed with above 10%, preferably 10 to 50% of iron oxide based on the weight of the mixture. The iron oxide to be used may be the one obtained by subsequent oxidation of the iron chloride. Over the lower limit of 10%, the larger the iron oxide proportion, the more smoothly the oxidizing reaction will be carried out. Beyond 50%, however, no more beneficial effect will be attained. For these reasons it is preferable to adopt the iron oxide percentage within the range of 10 to 50 weight percent. The solid phase mixture of iron chloride and iron oxide is charged into a fluidizing roasting furnace and oxygen gas in a stoichiometric amount or greater, typically 1.1 times that amount is blown in from the furnace bottom to form a fluidized bed of the mixture. Then an oxidizing reaction is carried out at temperatures between 600° and 1,000° C. To avoid sintering of the fluidizing bed during the reaction, it is preferred to keep the furnace temperature within a narrower range of from 600° to 800° C. The reaction temperature is maintained by the heat developed by the oxidizing reaction of iron chloride and the small quantity of coke carried thereby, that is the reaction is autogeneous roasting reaction, and no external heating is required. On the contrary, it is necessary to dissipate the excess heat produced by the oxidizing reaction and control the reaction temperature.

Of the mixture charged into the fluidizing roasting furnace, iron chloride is oxidizing by oxygen to iron oxide. Almost all quantity of iron oxide thus produced is taken out as an overflow from the fluidized bed through an extracting conduit provided for discharging the solids from the furnace. Some unreacted iron chloride which is fine particles and fine particulate iron oxide are discharged as a carryover, together with gases, from the top of the fluidizing roasting furnace. After they are cooled, the solids are separated from the gases and recovered for reuse in mixture with iron chloride.

The gases freed from the solids contain chlorine in a high concentration and can be utilized as a source of chlorine gas for the chlorination of titanium ores. In the meantime, the solid matter composed chiefly of iron oxide and taken out as the overflow from the fluidized bed of the fluidizing roasting furnace is directly fed to a secondarily installed roasting furnace. This may be accomplished by gravity-feeding the overflow from the primary fluidizing roasting furnace to the secondary furnace through an extracting conduit interconnected therebetween. In the latter furnace the small amount of unreacted iron chloride present in the overflow is oxidized by the addition of oxygen and completely recovered as iron oxide, while the chlorine simultaneously produced and chlorine purged out of between particles are recycled back to the primary roasting furnace through the extracting conduit. The secondary roasting furnace is of any type in which oxygen may be injected to oxidize the small amount of unreacted iron chloride and to displace and take place of chlorine gas present in interstices between the overflow particles.

According to the second aspect of this invention, the iron oxide obtained in the foregoing manner is, after cooling, charged into the fluidized bed of the fluidizing roasting furnace in an amount necessary for the control of the reaction temperature thereof, so that chlorine and iron oxide can be recovered from the furnace in stabilized operation. The recycled iron oxide may be fed by gravity falling to the fluidized bed of the primary roasting furnace or otherwise may be mixed with the charging premixture of iron oxide and iron chlorides or with the carryover material recycled back to the primary furnace. In this way the present invention renders it easy to obtain iron oxide and recover chlorine in a high yield from iron chloride.

With great hygroscopicity and low bulk density due to fineness of the particles, iron chloride usually is cumbersome to handle. However, mixing with iron oxide in accordance with the invention makes it less hydgoscopic with increased bulk density, and the solid mixture is extremely easy to handle. Thus the process of the invention has precluded any trouble which may arise from moisture absorption and low bulk density of the compound. It is to be noted, of course, that the iron oxide thus obtained is satisfactorily useful as a material for iron manufacture.

Other advantages derivable from the process of the invention include the following.

Since iron chloride is treated in solid phase and the oxidizing reaction is carried out using oxygen, there is no possibility of other gases finding their way into the system and chlorine gas can be recovered in a high concentration. Also, the additional roasting of iron chloride in the secondary furnace perfectly precludes the ingress of unreacted iron chloride into iron oxide, and the chlorine gas formed by the secondary roasting is recovered, too. The chlorine recovery rate is well over 99% and, because oxygen is used for the oxidizing reaction, a gaseous product with a chlorine concentration of over 60 vol.% is obtained. This chlorine-containing gas is satisfactory for use in the chlorinating roasting of titanium ores. Further, in accordance with this invention, the reaction temperature can be adjusted with utmost ease by cooling the resulting iron oxide and recycling the same to the fluidizing roasting furnace. This eliminates the necessity of installing any special device or equipment for temperature control and insures continued furnace operation in remarkably stabilized manner.

As has been described hereinabove, the present invention provides a simplified and industrially advantageous process for treating iron chloride.

The following examples will serve to illustrate the invention.

EXAMPLE 1

A fluidizing oxidizing furnace of quartz tube 100 mm in inside diameter and 1000 mm in length was used as a primary oxidizing roasting furnace. Iron chloride (composed of 54.8% $FeCl_3$, 30.2% $FeCl_2$, 6.3% C, and 8.7% balance) produced by directly chlorinating ilmenite was premixed with iron oxide in varied proportions set forth in the following Table. The premixture was charged into the furnace, and oxygen in an amount 1.1 times the equivalent of the charge was blown into the furnace from its bottom. The charge was fluidized and roasted at 800° C. The overflow from the fluidized bed was extracted and transferred into a secondary roasting furnace maintained at a temperature of 600° C, where it was further roasted with the supply of oxygen in an amount of 0.03 to 0.04 times the equivalent. The secondary furnace was of quartz and had 50 mm inside diameter and 500 mm height and equipped with an external heating means.

Fine particles of iron oxide and unreacted iron chloride were collected as the carryover from the exhaust gas by a bag filter.

The experiment was repeated with the charges of varied compositions, and the results were as tabulated below.

| Material composition (%) | | Feed rate of iron chloride of premixture (g/min) | Carryover rate (%) |
| --- | --- | --- | --- |
| $Fe_2O_3$ | Iron chloride | | |
| 0 | 100 | 50 | 85.0 |
| 10 | 90 | 42 | 40.2 |
| 20 | 80 | 38 | 33.6 |
| 25 | 75 | 36 | 30.9 |
| 40 | 60 | 40 | 31.2 |
| 50 | 50 | 38 | 30.2 |
| 60 | 40 | 40 | 30.5 |
| 70 | 30 | 38 | 30.6 |

Throughout these experiments it was recognized that, with increased proportion of iron oxide, the material mixture was easier to handle.

The chlorine content of the overflow from the primary roasting furnace was 1.47%, and that of iron oxide taken out of the secondary roasting furnace after a predetermined retention period was less than 0.09%, indicating that the chlorine loss was negligible and the chlorine recovery rate attained was over 99%. The particle size of the iron oxide obtained was such that the particles which passed a 325-mesh sieve accounted for 3.1% and those which did not pass a 200-mesh sieve accounted for 73.9%. The gas composition after the passage through the bag filter was: 70.0% $Cl_2$, 26.5% $CO_2$, 1.0% $O_2$, 0.5% CO, and 2% miscellaneous gases. The gas composition was appropriate for direct use in chlorination.

EXAMPLE 2

In this example the primary roasting furnace was a fluidizing oxidizing furnace of refractory tube 200 mm in inside diameter and 1500 mm in length. Iron chloride (50.0% $FeCl_2$, 35.5% $FeCl_3$, 3.3% C, and 11.2% balance) formed by direct chlorination of ilmenite was premixed with iron oxide the amount of iron oxide being 25 percent by weight based on the weight of the premixture. The premixture was charged into the furnace at a rate of 254 g/min. With oxygen blown in from the bottom of the furnace in an amount of 1.1 times the equivalent of the charge, fluidized roasting was carried out at 800° C. The fluidized roasting was continued for 25 hours. The resulting overflow from the fluidized bed was extracted and recharged into a secondary roasting furnace which was made of quartz and had the dimension of 100 mm inside diameter × 500mm height. The secondary furnace was provided with an external heating means. The overflow was reroasted at 600° C with the addition of oxygen in an amount of 0.03 times the aforementioned equivalent. As already noted, the heat of reaction was built up in the primary roasting furnace and the temperature in the furnace rose with the progress of fluidizing roasting. Since the solid particles constituting the fluidized bed tend to sinter to each other at upwards of 900° C, a part of the iron oxide obtained from the secondary roasting furnace was supplied after cooling to the fluidized bed of the primary furnace by means of a feeder operatively connected with a thermometer adapted for measuring furnace temperature so that the fluidized bed temperature was controlled to be 750° C ±20° C. The recycling rate of iron oxide was about 30 g/min.

The results obtained in this example were quite satisfactory, and stabilized operation was kept on. The carryover from the primary roasting furnace, maintained at the rate of less than 30%, was, of course, recycled to the furnace with a screw feeder after cooled and collected by means of a bag filter. The particle size of the resulting iron oxide was practically the same as that in Example 1. With a chlorine content of not more than 0.09%, the product was useful for iron manufacture. Thus the chlorine loss was very small and the chlorine recovery rate acheived was more than 99%. An analysis of the gaseous mixture after the passage through a bag filter indicated that it comprised 69.2% $Cl_2$, 22.6% $CO_2$, and 5.7% $O_2$. It was well suited for reuse in chlorination.

Since certain changes in carrying out the above process may be made without departing from its scope, it is intended that all matter contained in the foregoing description shall be interpreted as illustrative and not in a limiting sense.

What we claim is:

1. A process for producing titanium tetrachloride as well as iron oxide from iron-containing titanium ore comprising the steps of:
   chlorinating the iron-containing titanium ore with chlorine or chlorine-containing gas,
   recovering titanium tetachloride vapor followed by cooling it to obtain titanium tetrachloride product,
   recovering iron chloride vapor followed by cooling it to obtain solid chloride,
   adding solid iron oxide to said solid iron chloride in an amount above 10 percent by weight based on the weight of the resulting mixture,
   charging the mixture of solid iron oxide and solid iron chloride into a fluidizing roasting furnace,
   blowing oxygen-containing gas into the fluidizing roasting furnace from its bottom to form a fluidized bed of said mixture and to effect the oxidizing roasting in the fluidized roasting furnace at a temperature of 600 to 1000 C,
   removing chlorine from the fluidizing roasting furnace adjacent the top thereof,
   extracting the overflow from the fluidized bed in said fluidizing roasting furnace,
   charging the extracted overflow into a secondary roasting furnace for additional oxidizing roasting and for purging chlorine present in interstices between the overflow particles, and
   removing iron oxide product from the secondary roasting furnace.

2. Process according to claim 1 wherein in said fluidizing roasting furnace oxygen is injected in a stoichiometric amount or greater.

3. Process according to claim 2 wherein in said fluidizing roasting furnace oxygen is injected in an amount 1.1 times theoretical equivalent of the charged mixture.

4. Process according to claim 1 wherein in said secondary roasting furnace oxygen is injected in a sufficient amount to effect the oxidation of all unreacted iron chloride included in the extracted overflow.

5. Process according to claim 4 wherein oxygen is injected in an amount of about 0.03 to 0.04 times the equivalent of said mixture charged into the fluidizing roasting furnace.

6. Process according to claim 1 wherein the iron-containing titanium ore is directly chlorinated to titanium tetrachloride and iron chloride vapors followed by separating them.

7. Process according to claim 1 wherein the chlorine-containing gas produced in said fluidizing roasting furnace is employed as the chlorinating gas for the iron-containing titanium ore.

8. Process according to claim 1 wherein the chlorine-containing gas produced in said fluidizing roasting furnace is employed in mixture with pure chlorine as the chlorinating gas for the iron-containing titanium ore.

9. Process according to claim 1 wherein said iron-containing titanium ore is ilmenite.

10. Process according to claim 1 wherein said iron oxide is added in an amount of 10 to 50 percent by weight based on the resulting mixture.

11. Process according to claim 1 wherein the reaction temperature is in the range of from 600° to 800° C.

12. Process according to claim 1 wherein some unreacted iron chloride and fine particulate iron oxide discharged from the fluidizing roasting furnace are recycled into said fluidizing roasting furnace.

13. Process according to claim 1 wherein the reaction temperature in the secondary roasting furnace is maintained at about 600° C.

14. Process according to claim 1 wherein the chlorine-containing gas from the secondary roasting furnace is introduced into the fluidizing roasting furnace.

15. Process according to claim 1 wherein part of the iron oxide removed from said secondary roasting furance is used for the preparation of the mixture.

16. Process according to claim 1 wherein said iron oxide removed from the secondary roasting furnace is partially mixed with the charging mixture or the carry-over recycled or both.

17. A process for obtaining chlorine and iron oxide from iron chloride comprising the steps of:
  adding iron oxide to iron chloride preliminarily prepared by chlorinating iron-containing titanium ore, said iron oxide being added in an amount of more than 10 percent by weight based on the weight of the resulting mixture,
  charging the mixture of iron oxide and iron chloride is solid phase into a fluidizing roasting furnace,
  blowing oxygen-containing gas into the fluidizing roasting furnace from its bottom to form a fluidized bed of said mixture and to effect the oxiding roasting in the fluidizing roasting furnace at a temperature of 600 to 1000 C,
  removing the chlorine from the fluidizing roasting furnace adjacent the top thereof,
  extracting the overflow from said fluidized bed in the fluidizing roasting furnace,
  charging the extracted overflow into a secondary roasting furnace for additional oxidizing roasting and for purging chlorine gas present in interstices between the overflow particles, and
  removing iron oxide from the secondary roasting furnace.

18. Process according to claim 17 wherein in said fluidizing roasting furnace oxygen is injected in a stoichiometric amount, or greater.

19. Process according to claim 18 wherein in said fluidizing roasting furnace oxygen is injected in an amount 1.1 times theoretical equivalent of the charged mixture.

20. Process according to claim 17 wherein in said secondary roasting furnace oxygen is injected in a sufficient amount to effect the oxidation of all unreacted iron chloride included in the extracted overflow.

21. Process according to claim 20 wherein oxygen is injected in an amount of about 0.03 to 0.04 times the equivalent of said mixture charged into the fluidizing roasting furnace.

22. Process according to claim 17 wherein said iron-containing titanium ore is ilmenite.

23. Process according to claim 17 wherein said iron oxide is added in an amount of 10 to 50 weight percent based on the weight of the mixture.

24. Process according to claim 17 wherein the reaction temperature is in the range of from 600° to 800° C.

25. Process according to claim 1 wherein some unreacted iron chloride and fine particulate iron oxide discharged from the fluidizing roasting furnace are recycled into said fluidizing roasting furnace.

26. Process according to claim 17 wherein the gas mainly composed of chlorine and discharged from the fluidizing furnace is reused for the chlorination treatment.

27. Process according to claim 17 wherein the reaction temperature in the secondary roasting furnace is maintained at about 600° C.

28. Process according to claim 17 wherein the chlorine-containing gas from the secondary roasting furnace is introduced into the fluidizing roasting furnace.

29. Process according to claim 17 wherein some of the iron oxide removed from said secondary roasting furnace is used for the preparation of the mixture.

* * * * *